United States Patent
Lei

(10) Patent No.: US 8,248,917 B2
(45) Date of Patent: Aug. 21, 2012

(54) METHOD AND SYSTEM FOR IMPLEMENTING PROTECTION SWITCHING IN MULTI-PROTOCOL LABEL SWITCHING NETWORK

(75) Inventor: Wenyang Lei, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 881 days.

(21) Appl. No.: 11/688,972

(22) Filed: Mar. 21, 2007

(65) Prior Publication Data

US 2007/0242605 A1   Oct. 18, 2007

Related U.S. Application Data

(63) Continuation of application No. PCT/CN2005/001568, filed on Sep. 26, 2005.

(30) Foreign Application Priority Data

Sep. 27, 2004 (CN) .......................... 2004 1 0080936

(51) Int. Cl.
  *G01R 31/08* (2006.01)
(52) U.S. Cl. ....................................... 370/217; 370/225
(58) Field of Classification Search .......... 370/216–220, 370/225–228, 229–232, 252, 253, 389, 400, 370/401, 412, 413, 415, 417; 709/200, 238, 709/239
See application file for complete search history.

(56) References Cited

U.S. PATENT DOCUMENTS

| 7,106,729 | B1 * | 9/2006 | Gullicksen et al. | 370/388 |
|---|---|---|---|---|
| 7,269,132 | B1 * | 9/2007 | Casey et al. | 370/219 |
| 7,336,615 | B1 * | 2/2008 | Pan et al. | 370/248 |
| 7,345,991 | B1 * | 3/2008 | Shabtay et al. | 370/225 |
| 2002/0060985 | A1 | 5/2002 | Lee et al. | |
| 2003/0126287 | A1 | 7/2003 | Charny et al. | |
| 2003/0147346 | A1 * | 8/2003 | Kanakubo | 370/227 |
| 2004/0193724 | A1 | 9/2004 | Dziong et al. | |

(Continued)

FOREIGN PATENT DOCUMENTS

CN    1394053 A    1/2003

(Continued)

OTHER PUBLICATIONS

"Protection switching for MPLS networks;" ITU-T Standard in Force (I), International Telecommunications Union, Geneva, CH, No. Y1720 9/3, Sep. 13, 2003 pp. 1-34 XP01740438.

(Continued)

*Primary Examiner* — Kerri Rose
(74) *Attorney, Agent, or Firm* — Slater & Matsil, L.L.P.

(57) ABSTRACT

The embodiments of the present invention provide a method and a system for implementing protection switching in Multi-protocol Label Switching (MPLS) network, the method includes: transmitting by a first Egress Label Switched Router (LSR) first probe packets to an Ingress LSR via a first Label Switching Path (LSP); switching by the Ingress LSR working traffic to a third LSP terminated at a second Egress LSR when the Ingress LSR does not receive the first probe packets. According to the embodiments of the present invention, the Ingress LSR may learn the failure of the Egress LSR according to the result of receiving the probe packets when a failure of the Egress LSR occurs, and switches the working traffic correspondingly. Moreover, the working LSP and protection LSP are not terminated at a same Egress LSR, but correspond to different Egress LSRs which greatly improves the security of the MPLS network.

14 Claims, 2 Drawing Sheets

U.S. PATENT DOCUMENTS

| | | | |
|---|---|---|---|
| 2006/0233137 A1* | 10/2006 | Dantu et al. | 370/331 |
| 2007/0076720 A1* | 4/2007 | Wu | 370/392 |

FOREIGN PATENT DOCUMENTS

| | | | |
|---|---|---|---|
| CN | 1466832 A | | 1/2004 |
| CN | 1501644 A | | 6/2004 |
| EP | 1422870 | | 5/2004 |
| JP | 2003-124978 A | | 4/2003 |
| KR | 20030001635 | | 8/2003 |
| WO | WO 02/065607 A1 | | 8/2002 |
| WO | WO 03/060745 A1 | | 7/2003 |

OTHER PUBLICATIONS

Neil Harrison, et al; "OAM Functionality for MPLS Networks;" IETF Standard-Working-Draft, Internet Engineering Task Force, IETF, CH, Feb. 2001 XP015014105.

Changcheng Huang, et al; "Building Reliable MPLS Networks Using a Path Protection Mechanism;" IEEE Communications Magazine, IEEE Service Center, Piscataway, US, vol. 40, No. 3, Mar. 2002 pp. 156-162 XP011092802.

Mao, Yongua et al; "MPLS OAM Technology" Information Network, Jun. 30, 2003.

International Telecommunication Union, "ITU-T Recommendation Y.1710; Requirements for Operation & Maintenance Functionality for MPLS Networks," ITU-T Y-Series Recommendations: Global Information Infrastructure and Internet Protocol Aspects, Nov. 2002, 12 pages.

International Telecommunication Union, "ITU-T Recommendation Y.1720; Protection Switching for MPLS Networks," ITU-T Y-Series Recommendations: Global Information Infrastructure and Internet Protocol Aspects, Apr. 2003, 20 pages.

International Telecommunication Union, "ITU-T Recommendation Y.1711; Operation & Maintenance Mechanism for MPLS Networks," ITU-T Y-Series Recommendations: Global Information Infrastructure, Internet Protocol Aspects and Next Generation Networks, Feb. 2004, 36 pages.

Chinese Office Action, Application No. 200410080936.6, Dated Mar. 9, 2007, 15 pages.

* cited by examiner

METHOD AND SYSTEM FOR IMPLEMENTING PROTECTION SWITCHING IN MULTI-PROTOCOL LABEL SWITCHING NETWORK

FIELD OF THE INVENTION

The present invention relates to the Multi-protocol Label Switching (MPLS) technique, and more particularly, to a method and a system for implementing protection switching in an MPLS network.

BACKGROUND OF THE INVENTION

The MPLS technique, as a key technique in Next Generation Network, has been playing a more and more important role in IP networks. At the beginning, the MPLS technique was put forward to increase the forwarding speed of routers; however, it has been widely applied in the fields of traffic engineering, Virtual Private network (VPN) and Quality of Service (QoS) because of its inherent advantages and is becoming an important standard in large scale IP networks.

In the MPLS network, a label switching is used to forward data packets, and thus the routing of network may be controlled flexibly. The Forwarding path of data packet, in the MPLS network, is called Label Switched Path (LSP). The LSP is defined by the switching of label value, and the label value of data packet is switched at Label Switching Routers (LSRs) which may include an Ingress LSR and an Egress LSR.

In the MPLS network, it has become a pressing issue to detect failures and implement protection switching, as the MPLS technique has become a key technique for IP network multi-service bearer. Protection switching enhances the reliability and availability performance of MPLS networks. The protection switching implies that both routing and resources are pre-calculated and allocated to a dedicated protection LSP prior to failures of a working LSP. The protection switching therefore offers a strong assurance of being able to re-obtain the required network resources when the LSP connectivity is defected or interrupted.

FIG. 1 is a flow chart illustrating the protection switching in MPLS network in an existing art. As shown in FIG. 1, the method includes the following steps of:

Step 101: an Ingress LSR transmitting periodically probe packets via an LSP to an Egress LSR.

Step 102: if the Egress LSR does not receive the probe packets within pre-determined times, determining that the LSP is failed; the Egress LSR then transmitting a Backward Defect Indication (BDI) message to the Ingress LSR via a reverse path, to notify the Ingress LSR the failure of the LSP.

Step 103: upon receiving the BDI message, the Ingress LSR switching the working traffic to a protection LSP.

FIG. 2 is a schematic diagram illustrating the protection switching in the MPLS network in the existing art. As shown in FIG. 2, in a normal condition, the working traffic is distributed to the working LSP. The Egress LSR, if not receiving the probe packets within pre-determined times, transmits the BDI message to the Ingress LSR via a reverse path. Upon receiving the BDI message, the Ingress LSR switches the working traffic to the protection LSP.

In the existing art, the Ingress LSR determines that the LSP has been failed while receiving the BDI message, and correspondingly switches the working traffic. However, when a failure of the Egress LSR occurs, if a failure of the working LSP occurs, the Egress LSR is likely unable to transmit the BDI message to the Ingress LSR. The Ingress LSR thus may not switch the working traffic, as it may not learn that a failure of the working LSP occurs.

Furthermore, the Ingress LSR may not switch the working traffic when a failure of the Egress LSR occurs in the existing art, since the failed Egress LSR couldn't notify the Ingress LSR the failure in time. Consequently, the working LSP and protection LSP may only be terminated at the same Egress LSR limitedly. That is, the Ingress LSR is failed to terminate the working LSP and protection LSP at different Egress LSRs, as the Ingress LSR can not learn the working status of the Egress LSR, thereby reducing the security of the MPLS network.

SUMMARY OF THE INVENTION

The embodiments of the present invention provide a method and a system for implementing protection switching in MPLS network, to enable an Ingress LSR to switch working traffic when a failure of an Egress LSR occurs.

A method for implementing protection switching in MPLS network, includes:

transmitting, by a first Egress LSR, first probe packets to an Ingress LSR via a first LSP;

switching, by the Ingress LSR, working traffic to a third LSP terminated at a second Egress LSR when the Ingress LSR does not receive the first probe packets.

A system for implementing protection switching in Multi-protocol Label Switching (MPLS) network, includes:

a first Egress LSR;

a second Egress LSR;

an Ingress LSR, configured to receive first probe packets from the first Egress LSR through a first LSP, and switch working traffic to a third LSP terminated at the second Egress LSR if the Ingress LSR does not receive the first probe packets.

It can be seen from the above technical solution that, according to the embodiments of the present invention, the first LSP between the Ingress LSR and the first Egress LSR is established, and the first Egress LSR transmits probe packets to the Ingress LSR via the first LSP. When not receiving the probe packets, the Ingress LSR performs working traffic switching. Accordingly, in the application of the embodiments of the present invention, the Ingress LSR may learn the failure of the Egress LSR according to the result of receiving the probe packets when a failure of the Egress LSR occurs, and switches the working traffic correspondingly.

Furthermore, in the application of the embodiments of the present invention, the working traffic may be switched from the working LSP to a protection LSP connected to other Egress LSR working normally when the working traffic needs to be switched, since the Ingress LSR may learn the failure of the Egress LSR. In the existing art, however, the Ingress LSR may not learn the failure of the Egress LSR, thus may not switch the working LSP to a protection LSP connected to other Egress LSR working normally when a failure of the Egress LSR occurs. Therefore, the working LSP and protection LSP are not limited to be terminated at a same Egress LSR, but correspond to different Egress LSRs after the embodiment of the present invention is applied, which greatly improves the security of the MPLS network.

DETAILED DESCRIPTION OF THE INVENTION

The present invention will be described in detail hereinafter with reference to the accompanying drawings and embodiments, so as to make the technical solution and merits of the present invention more apparent.

According to the embodiments of the present invention, a first LSP is firstly established between an Ingress LSR and a first Egress LSR, and the first Egress LSR transmits first probe packets to the Ingress LSR via the first LSP. The Ingress LSR then determines whether to switch working traffic according to the result of receiving the probe packets transmitted by the first Egress LSR.

Figure 1:
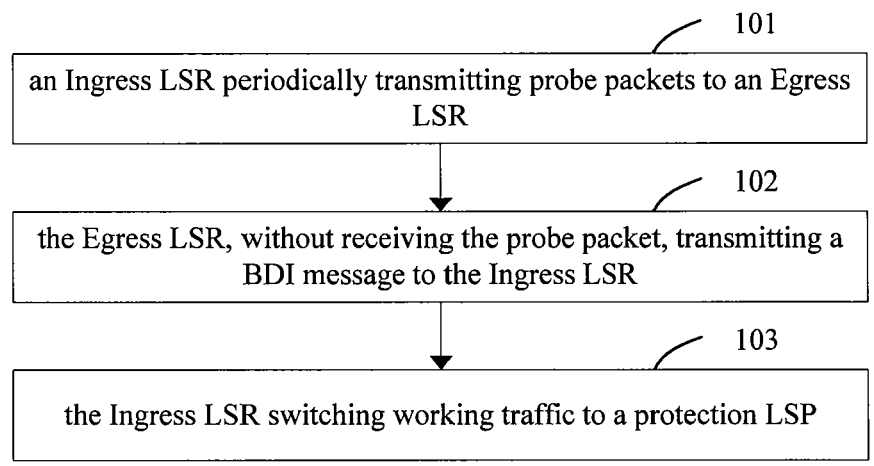
FIG. 1 is a flow chart illustrating the protection switching in MPLS network in an existing art.
Figure 2:
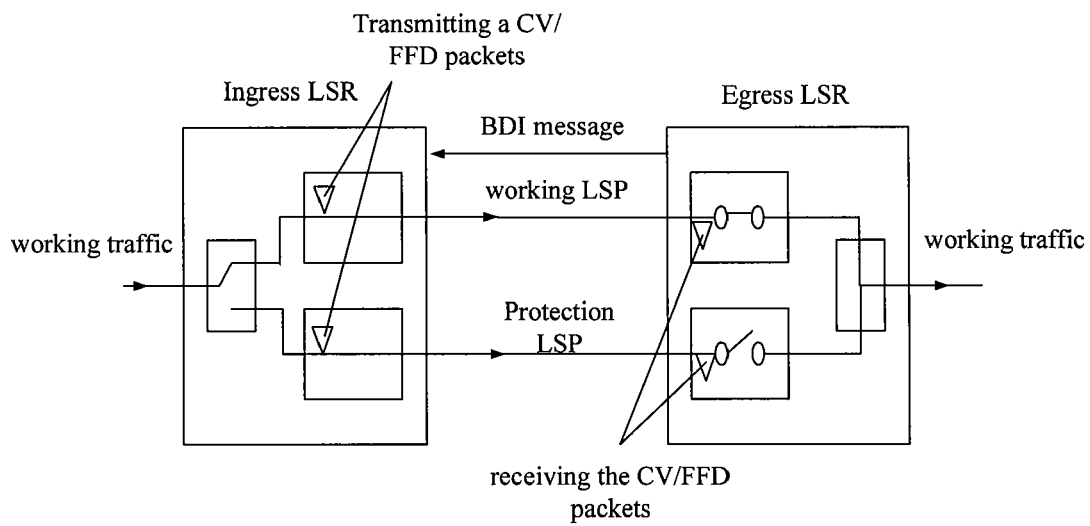
FIG. 2 is a schematic diagram illustrating the protection switching in MPLS network in the existing art.
Figure 3:
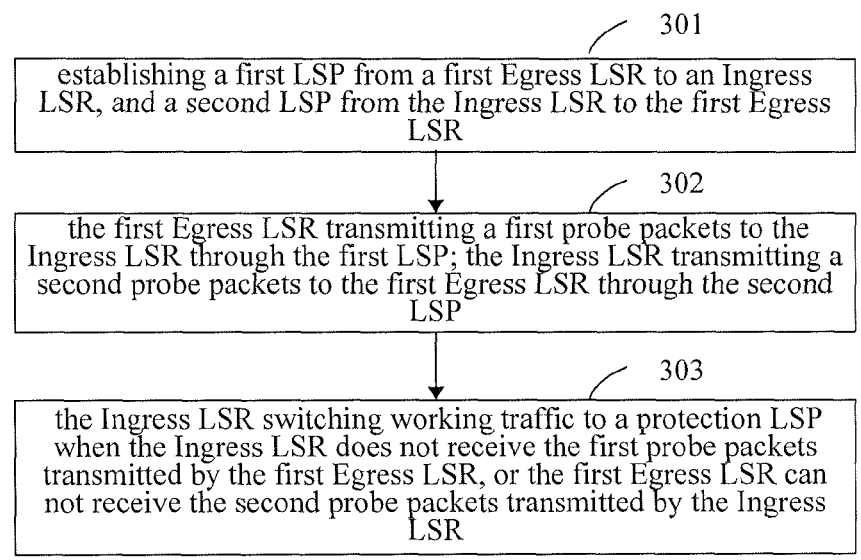
FIG. 3 is a flow chart illustrating the protection switching in MPLS network according to an embodiment of the present invention.

FIG. 3 is a schematic flow chart illustrating the protection switching in MPLS network according to an embodiment of the present invention. As shown in FIG. 3, the method includes the following steps.

Step 301: establishing a first LSP from a first Egress LSR to an Ingress LSR, and a second LSP from the Ingress LSR to the first Egress LSR.

The traffic of various services in the MPLS network are generally bidirectional, and these bidirectional traffics are implemented via two LSPs. Firstly, establish the first LSP and the second LSP between the Ingress LSR and the first Egress LSR, wherein the first LSP may or may not correspond to the second LSP. The first LSP and second LSP may be further bounded after being established, by which a bidirectional LSP is established actually.

Step 302: the first Egress LSR transmitting first probe packets to the Ingress LSR via the first LSP; and the Ingress LSR transmitting second probe packets to the first Egress LSR via the second LSP.

The first probe packets transmitted by the first Egress LSR to the Ingress LSR, as well as the second probe packets transmitted by the Ingress LSR to the first Egress LSR, may be Connectivity Verification (CV) packets or Fast Failure Detection (FFD) packets. Both the CV packets and FFD packets are used to verify the connectivity of LSP in the MPLS network. Moreover, both the formats and contents of the CV packets and FFD packets are the same, while the only difference between the CV packets and FFD packets is the different transmitting frequency.

Preferably, the first Egress LSR transmits the first probe packets periodically to the Ingress LSR. And the Ingress LSR periodically transmits the second probe packets to the first Egress LSR. More preferably, when the CV packets are used as the first probe packets and/or the second probe packets, the transmitting speed of the CV packets is one packet per second, that is, the first Egress LSR periodically transmits to the Ingress LSR the CV packets of which the transmission interval is one second, or the Ingress LSR periodically transmits to the first Egress LSR the CV packets of which the transmission interval is one second. More preferably, when the FFD packets are used as the first probe packets and/or the second probe packets, the transmitting speed of the FFD packets is one packet per fifty milliseconds, that is, the first Egress LSR periodically transmits to the Ingress LSR the FFD packets of which the transmission interval is fifty milliseconds, or the Ingress LSR periodically transmits to the first Egress LSR the FFD packets of which the transmission interval is fifty milliseconds. Correspondingly, the transmitting cycles of the CV packets and FFD packets may be modified according to real requirements.

Step 303: the Ingress LSR switching the working traffic to a protection LSP, when the Ingress LSR does not receive the first probe packets transmitted by the first Egress LSR, or the first Egress LSR does not receive the second probe packets transmitted by the Ingress LSR.

Herein, when not receiving the first probe packets transmitted by the first Egress LSR, the Ingress LSR determines that a failure of the first LSP or the first Egress LSR has occurred, and switches the working traffic. Similarly, the Ingress LSR, when the first Egress LSR does not receive the second probe packets transmitted by the Ingress LSR, also starts to switch the working traffic.

Preferably, a receiving threshold N1 for the first probe packets may be preset. If the Ingress LSR does not receive the first probe packets for consecutive N1 times, the Ingress LSR switches the working traffic. More preferably, the N1 mentioned herein equals to 3.

Similarly, a receiving threshold N2 for the second probe packets may be preset. If the first Egress LSR does not receive the second probe packets for consecutive N2 times, the Ingress LSR switches the working traffic. For example, the first Egress LSR transmits a BDI message to the Ingress LSR via a reverse path, i.e. the first LSP, when not receiving the second probe packets for consecutive N2 times. The Ingress LSR implements switching upon receiving the BDI message. More preferably, the N2 mentioned herein equals to 3.

When switched, the working traffic may be switched to the protection LSP. For instance, the working traffic may be switched to the protection LSP connected to the first Egress LSR.

Preferably, a third LSP from the Ingress LSR to a second Egress LSR may be firstly established, which is used as a protection LSP. When switched, the working traffic may be switched to the third LSP. More preferably, a fourth LSP from the second Egress LSR to the Ingress LSR may be further established. After the Ingress LSR switches the working traffic to the third LSP, the second Egress LSR transmits third probe packets to the Ingress LSR via the fourth LSP. When not receiving the third probe packets, the Ingress LSR again switches the working traffic to a next protection LSP which may be a protection LSP connected to the second Egress LSR. Correspondingly, the Ingress LSR may further connect to a third Egress LSR, to switch the working traffic to the protection LSP between the Ingress LSR and the third Egress LSR when a failure of the second Egress LSR occurs. Thus, the Ingress LSR is granted to switch the working traffic successfully again when a failure of the second Egress LSR occurs. It is easy to be appreciated that the Ingress LSR may further connect to more Egress LSRs to improve the security of the MPLS network.

Figure 4:
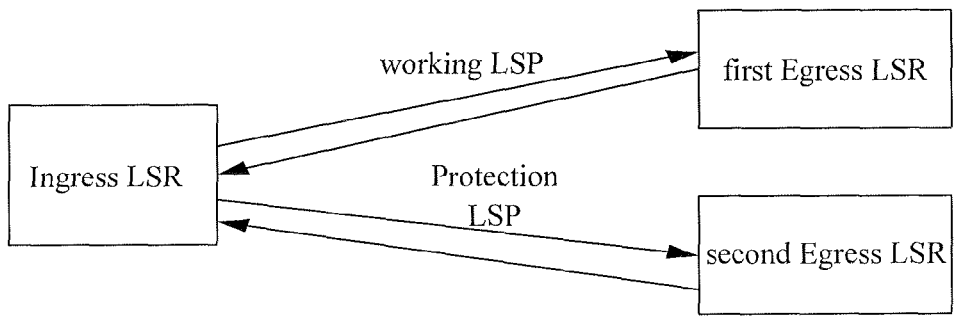
FIG. 4 is a schematic diagram illustrating the protection switching in MPLS network according to another embodiment of the present invention.

FIG. 4 is a schematic diagram illustrating the protection switching in MPLS network according to another embodiment of the present invention. As shown in FIG. 4, there is a bidirectional LSP, serving as the working LSP, between the Ingress LSR and the first Egress LSR. The bidirectional LSP includes two unidirectional LSPs. The Ingress LSR and the first Egress LSR respectively transmits a CV/FFD packet in the transmitting direction of the two unidirectional LSPs, and detect and receive the CV/FFD packet transmitted to them. Additionally, there is another bidirectional LSP serving as the protection LSP, between the Ingress LSR and the second Egress LSR, and the another bidirectional LSP includes two unidirectional LSPs as well.

In normal condition, the working traffic is distributed to the working LSP connected to the first Egress LSR. If the first Egress LSR does not receive the CV/FED packets from the Ingress LSR, the first Egress LSR determines that a failure of the working LSP occurs, and transmits the BDI message to the Ingress LSR via the reverse path. The Ingress LSR thus determines that a failure of the working LSP occurs. When receiving the BDI message or not receiving the probe packets transmitted by the first Egress LSR, the Ingress LSR switches the working traffic to the protection LSP connected to the second Egress LSR.

In the above embodiments, the Ingress LSR connects to the second Egress LSR to serve as a protection of the working LSP. However, the embodiment of the present invention is not limited to this. The Ingress LSR may also connect to multiple other Egress LSRs to serve as farther protections according to the embodiment of the present invention.

To sum up, the foregoing descriptions are only preferred embodiments of the present invention and are not for use in limiting the protection scope thereof. Any modification, equivalent replacement or improvement made under the spirit and principles of the present invention is included in the protection scope of the claims of the present invention.

What is claimed is:

1. A method for implementing protection switching in Multi-protocol Label Switching "MPLS" network, comprising:
   transmitting, by a first Egress Label Switching Router "LSR," first probe packets to an Ingress LSR via a first Label Switched Path "LSP";
   switching, by the Ingress LSR, working traffic to a third LSP terminated at a second Egress LSR when the Ingress LSR does not receive the first probe packets, wherein the second Egress LSR is different from the first Egress LSR.

2. The method of claim 1, further comprising:
   transmitting, by the Ingress LSR, second probe packets to the first Egress LSR via a second LSP;
   switching, by the Ingress LSR, the working traffic upon receiving a Backward Defect Indication "BDI" message from the first Egress LSR.

3. The method of claim 2, wherein the process of switching by the Ingress LSR the working traffic upon receiving the BDI message comprises:
   switching, by the Ingress LSR, the working traffic to the third LSP upon receiving the BDI message.

4. The method of claim 2, wherein the process of switching by the Ingress LSR the working traffic upon receiving the BDI message comprises:
   switching, by the Ingress LSR, the working traffic to a protection LSP between the Ingress LSR and the first Egress LSR upon receiving the BDI message.

5. The method of claim 2, wherein the second probe packets comprise one of CV packets and FFD packets.

6. The method of claim 2, wherein the process of transmitting the second probe packets to the first Egress LSR comprises:
   transmitting periodically, by the Ingress LSR, the second probe packets to the first Egress LSR.

7. The method of claim 2, further comprising:
   setting a receiving threshold N2 for the second probe packets;
   when the first Egress LSR does not receive the second probe packets for consecutive N2 times, sending the BDI message to the Ingress LSR.

8. The method of claim 1, wherein the first probe packets comprise one of Connectivity Verification "CV" packets and Fast Failure Detection "FFD" packets.

9. The method of claim 1, further comprising:
   after switching by the Ingress LSR the working traffic to the third LSP, transmitting, by the second Egress LSR, third probe packets to the Ingress LSR via a fourth LSP;
   switching, by the Ingress LSR, the working traffic to an LSP terminated at a third Egress LSR when the Ingress LSR does not receive the third probe packets.

10. The method of claim 1, wherein the process of transmitting the first probe packets to the Ingress LSR comprises:
    transmitting periodically, by the first Egress LSR, the first probe packets to the Ingress LSR.

11. The method of claim 1, further comprising:
    setting a receiving threshold N1 for the first probe packets;
    the Ingress LSR does not receive the first probe packets comprises:
    the Ingress LSR does not receive the first probe packets for consecutive N1 times.

12. A system for implementing protection switching in Multi-protocol Label Switching "MPLS" network, comprising:
    a first Egress Label Switching Router "LSR";
    a second Egress LSR;
    an Ingress LSR, configured to receive first probe packets from the first Egress LSR through a first Label Switched Path "LSP," and to switch working traffic to a third LSP terminated at the second Egress LSR if the Ingress LSR does not receive the first probe packets;
    wherein the second Egress LSR is different from the first Egress LSR.

13. The system of claim 12, wherein the Ingress LSR is further configured to transmit second probe packets to the first Egress LSR through a second LSP, and switch the working traffic to a protection LSP between the Ingress LSR and the first Egress LSR or the third LSP upon receiving a Backward Defect Indication "BDI" message from the first Egress LSR.

14. The system of claim 12, further comprising:
    a third Egress LSR;
    the Ingress LSR is further configured to receive third probe packets from the second Egress LSR through a fourth LSP, and switch the working traffic to an LSP terminated at the third Egress LSR when the Ingress LSR does not receive the third probe packets.

* * * * *